United States Patent
Lahr et al.

(10) Patent No.: US 11,822,713 B2
(45) Date of Patent: Nov. 21, 2023

(54) POSE AUGMENTATION OF HEAD WORN DISPLAY VIDEO FOR LATENCY REDUCTION

(71) Applicant: Rockwell Collins, Inc., Cedar Rapids, IA (US)

(72) Inventors: Weston J. Lahr, Sherwood, OR (US); Jared R. Prink, Newberg, OR (US); Alexander D. Reid, Tualatin, OR (US); Troy D. Driscoll, West Linn, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/345,325

(22) Filed: Jun. 11, 2021

(65) Prior Publication Data
US 2022/0397955 A1    Dec. 15, 2022

(51) Int. Cl.
| | | |
|---|---|---|
| *G06F 3/01* | (2006.01) | |
| *G06T 3/00* | (2006.01) | |
| *G02B 27/01* | (2006.01) | |
| *G02B 27/00* | (2006.01) | |

(52) U.S. Cl.
CPC ............ G06F 3/012 (2013.01); G06T 3/0093 (2013.01); *G02B 27/0093* (2013.01); *G02B 27/017* (2013.01); *G02B 2027/0187* (2013.01); *G06F 3/011* (2013.01)

(58) Field of Classification Search
CPC ........ G06F 3/012; G06F 3/011; G06T 3/0093; G02B 27/0093; G02B 27/017; G02B 2027/0187
See application file for complete search history.

(56) References Cited

U.S. PATENT DOCUMENTS

| | | | |
|---|---|---|---|
| 9,858,637 B1* | 1/2018 | Quach | G06F 3/012 |
| 9,898,866 B2* | 2/2018 | Fuchs | G06F 3/012 |
| 10,096,149 B2 | 10/2018 | Belogolovy | |
| 10,559,276 B2* | 2/2020 | Fruchter | G06T 19/006 |
| 10,776,992 B2* | 9/2020 | Melkote Krishnaprasad | G06F 3/011 |

(Continued)

FOREIGN PATENT DOCUMENTS

| | | |
|---|---|---|
| EP | 3572916 A3 | 12/2019 |
| EP | 3552081 B1 | 11/2020 |

(Continued)

OTHER PUBLICATIONS

Extended European Search Report in European Application No. 22178387.1 dated Nov. 3, 2022, 9 pages.

*Primary Examiner* — Mihir K Rayan
(74) *Attorney, Agent, or Firm* — Suiter Swantz pc llo

(57) ABSTRACT

A system comprising a head worn display and an image rendering computing device is disclosed. The head worn display comprises one or more image sensors, a head position sensor, and a head position computing device configured to determine a first head pose. The image rendering computing device is configured to render an enhanced image and embed the first head pose in the enhanced image. The head position computing platform is further configured to determine a second head pose, determine a difference between the second head pose and the first head pose, and warp the enhanced image based on the difference between the second head pose and the first head pose to correct for head motion of the user.

4 Claims, 2 Drawing Sheets

(56) References Cited

U.S. PATENT DOCUMENTS

| | | | |
|---|---|---|---|
| 2004/0252115 A1* | 12/2004 | Boireau | G09G 3/3611 |
| | | | 345/211 |
| 2011/0149094 A1* | 6/2011 | Chen | H04N 5/23261 |
| | | | 348/E5.022 |
| 2014/0321702 A1* | 10/2014 | Schmalstieg | G06V 20/00 |
| | | | 382/103 |
| 2015/0029218 A1* | 1/2015 | Williams | G02B 27/0172 |
| | | | 345/633 |
| 2015/0078628 A1* | 3/2015 | Anderson | G06F 18/22 |
| | | | 382/218 |
| 2016/0364904 A1* | 12/2016 | Parker | G06F 3/038 |
| 2018/0061121 A1* | 3/2018 | Yeoh | H04N 13/344 |
| 2018/0146189 A1* | 5/2018 | Park | H04N 13/344 |
| 2019/0037244 A1* | 1/2019 | Melkote Krishnaprasad | |
| | | | H04N 19/895 |
| 2021/0035353 A1 | 2/2021 | Nourai et al. | |

FOREIGN PATENT DOCUMENTS

| | | |
|---|---|---|
| EP | 3788781 A1 | 3/2021 |
| IL | 272651 A | 3/2020 |

* cited by examiner

POSE AUGMENTATION OF HEAD WORN DISPLAY VIDEO FOR LATENCY REDUCTION

SUMMARY

A head worn display system is disclosed in accordance with one or more illustrative embodiments of the present disclosure. In one illustrative embodiment, the system comprises a head worn display including: one or more image sensors configured to capture an image of an environment surrounding a user of the head worn display; a head position sensor configured to measure the user's head position; and a head position computing device configured to determine a first head pose based on head position measurements generated by the head position sensor at a first time. In another illustrative embodiment, the head worn display system comprises an image rendering computing device communicatively coupled to the head worn display configured to: render an enhanced image based on the image of the environment; and embed the first head pose in the enhanced image. The head position computing device is further configured to: determine a second head pose at a second time; determine a difference between the second head pose and the first head pose embedded in the enhanced image; and warp the enhanced image based on the difference between the second head pose and the first head pose to correct for head motion of the user.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
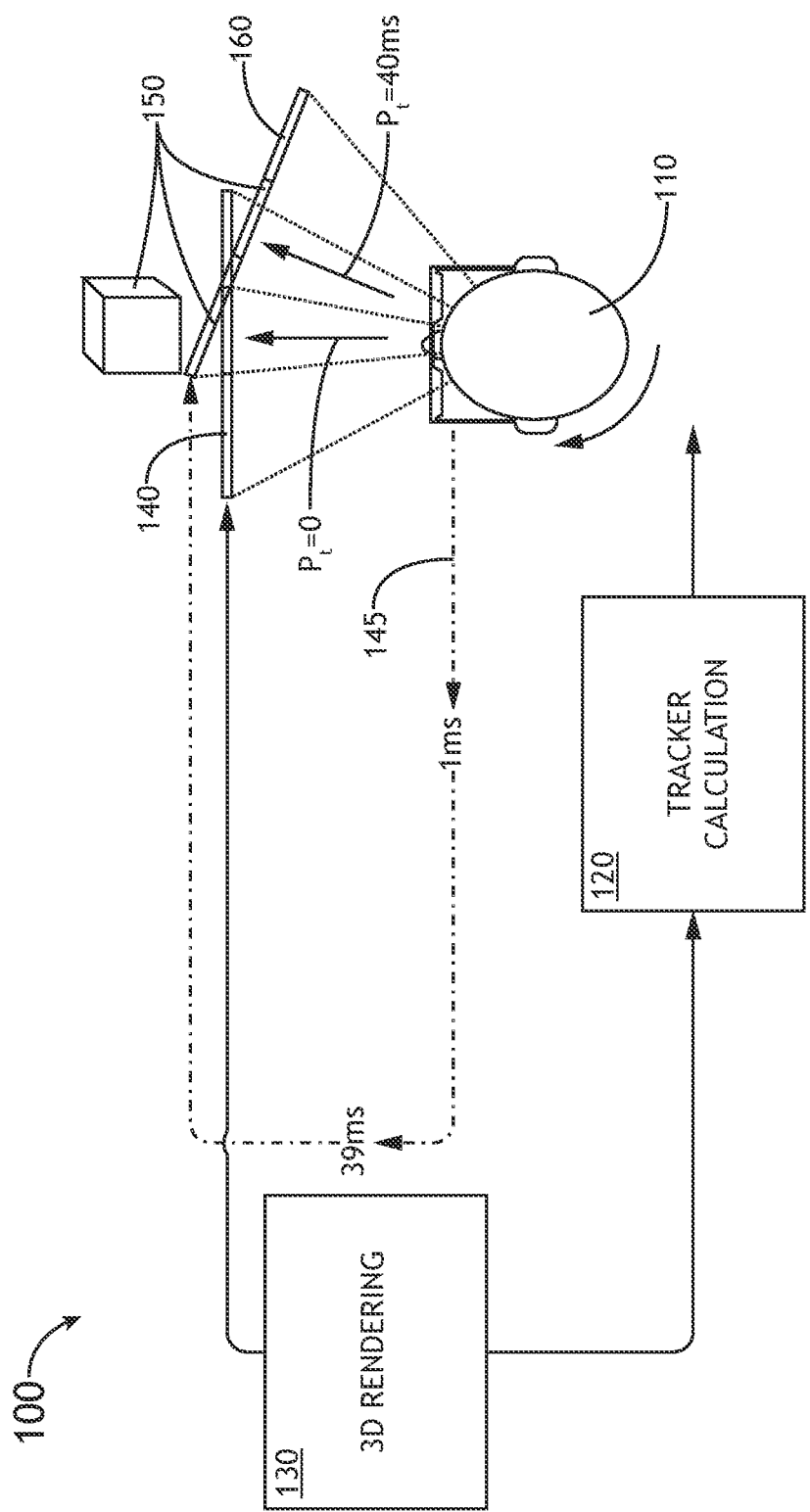
FIG. 1 is a flow diagram of a conventional head worn display system.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Head worn displays (HWDs), also known as head-mounted displays (HMDs), can be used to immerse a user in a virtual reality (VR) environment, an augmented reality (AR) environment, or a mixed reality (MR) environment. HWDs have applications including gaming, aviation, engineering, and medicine. A VR environment may entail displaying computer-generated imagery, while AR and/or MR environments may display imagery from the physical world surrounding the user with computer generated imagery and data imposed thereon. In general, the terms "augmented reality" and "mixed-reality" may be used interchangeably.

A common problem encountered in conventional HWD systems is latency between the head motion of the user and the visual update at the display (e.g., motion-to-photon latency). FIG. 1 is a flow diagram illustrating a conventional HWD system 100. The HWD 110 sends head position measurements 145 to a head position computing device 120 to calculate a head pose of the user of the HWD. Then, an image rendering computing device 130 generates an image based on the head pose. The generated image is then presented on a display attached to the HWD 110.

When the user moves the HWD 110 from the first perspective 140 ($P_{t=0}$) to the second perspective 160 ($P_{t=40\ ms}$), the object 150 appears in the wrong location in the generated image since the geometry used to generate image displayed at $P_{t=40\ ms}$ is based on $P_{t=0}$. The delay of 40 milliseconds may be uncomfortably high for the user of the HWD 110. For this reason, it is desirable to decrease motion-to-photon latency to ensure that the image presented to the user is visually congruent, and to reduce disorientation and motion sickness in the user of the HWD.

Figure 2:
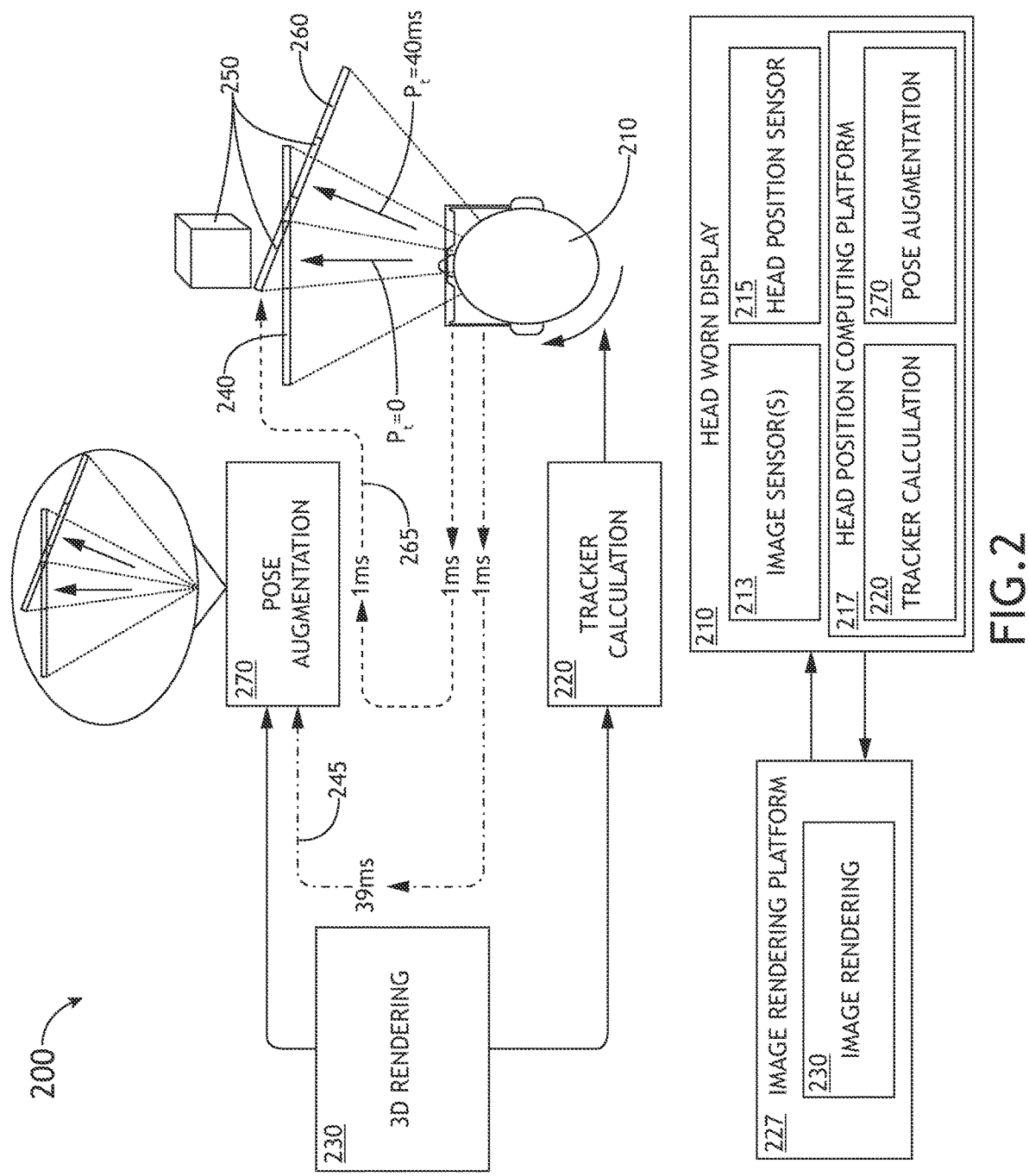
FIG. 2 is a flow diagram of a head worn display system implementing pose augmentation, in accordance with one or more embodiments of the present disclosure.

The embodiments of the present disclosure advantageously reduce motion-to-photon delay by warping an enhanced image using a second head pose measured before the image is displayed. FIG. 2 is a flow diagram illustrating a HWD system 200, in accordance with one or more embodiments of the present disclosure. The HWD system 200 comprises a HWD 210 and an image rendering computing device 227 communicatively coupled to the HWD 210 (i.e., a split-rendering system). The HWD 210 may include one or more image sensors 213, one or more head position sensors 215, and a head position computing device 217.

The one or more image sensors 213 (i.e., cameras) may be configured to capture images of the environment surrounding the user of the HWD 210. The one or more image sensors 213 may comprise a complementary metal oxide semiconductor (CMOS) sensor, a charge-coupled device (CCD) sensor, etc. The one or more image sensors 213 may be configured to detect visible light, infrared, ultraviolet, or a combination (e.g., multispectral fusion sensors). In general, the one or more image sensors 213 may capture high-resolution stereo video such that the user experiences the AR/MR/VR environment with a convincing sense of 3D presence. In AR and MR applications, the image(s) captured by the one or more image sensors 213 may serve as backgrounds for superimposition of symbology or other computer generated imagery (e.g., during rendering by the image rendering computing device 227).

The one or more head position sensors 215 may be configured to measure the user's head motion using a combination of accelerometer(s), gyroscope(s), magnetometer(s), global positioning system (GPS) sensors, altimeters, etc. The head position sensor(s) 215 may generate measurements based on the translation and rotation of the user (e.g., in six degrees of freedom). In some embodiments, the head position sensor(s) 215 may be one or more inertial measurement units (IMUs). In other embodiments, the head position sensor(s) 215 comprise one or more IR trackers or cameras near the user. In general, the one or more head position sensor(s) 215 may be any device that measures the orientation and position of the head of the user of the HWD 210 over time.

The head position computing device 217 may be a controller (e.g., computer or computing device) including one or more processors and a memory. In some embodiments, the head position computing device 217 may be on-board or embodied in the HWD 210 (e.g., part of the same mainboard or motherboard, and/or part of the same housing). For the purposes of the present disclosure, the term "processor" or "processing element" may be broadly defined to encompass any device having one or more processing or logic elements, for example, one or more central processing units (CPUs), one or more graphics processing units (GPUs), one or more micro-processor devices, one or more application specific integrated circuit (ASIC) devices, one or more field programmable gate arrays (FPGAs), or one or more digital signal processors (DSPs). In this sense, the one or more processors may include any device configured to execute algorithms and/or instructions (e.g., program instructions stored in memory), and may be configured to perform the method steps described in the present disclosure. In some embodiments, the processor(s) comprise an FPGA to ensure a low processing time for determining head poses based on measurements received from the one or more head position sensors 215. The memory medium may include any storage medium known in the art suitable for storing program instructions executable by the associated one or more processors. For example, the memory medium may include, but is not limited to, a read-only memory (ROM), a random-access memory (RAM), a magnetic or optical memory device (e.g., hard disk), a magnetic tape, a solid-state drive and the like.

At a first time, the image sensor(s) 213 may detect an image, and the head position sensor(s) 215 may generate head position measurements 245. The head position computing device 217 may then determine a first head pose associated with the head position measurements 245. The image and the first head pose may be transmitted to the image rendering computing device 227. The image rendering computing device 227 may be communicatively coupled to the HWD 210 and the head position computing device 217 (e.g., wirelessly or by a wired connection). In some embodiments, the image rendering computing device 227 may be part of an avionics system of an aircraft.

The image rendering computing device 227 may include processor(s) and a memory medium, as previously described. The image rendering computing device 227 may perform three-dimensional (3D) rendering to generate an enhanced image, for example, by overlaying information and/or virtual objects on the image detected by the one or more image sensor(s) 213. In some embodiments, the information may include avionics data such as communications data, navigation data, flight control data, object identification data, etc. (for example, in an AR environment). In some embodiments, the virtual objects may comprise terrain, obstacles, other aircraft, etc. (for example, in a VR environment). Additionally, the image rendering computing device 227 may embed the first pose in the enhanced image (e.g., as metadata).

After the enhanced image is rendered 230, the enhanced image including the first pose embedded therein may be transmitted to the head position computing device 217 for pose augmentation 270. Pose augmentation 270 may entail warping (i.e., transforming or projecting) the enhanced image using the most recently sensed head position measurements 265 from the head position sensor(s) 215. For example, the head position computing device 217 may determine a second head pose associated with the head position measurements 265. The computing device 217 may then determine a difference between the second head pose and the first head pose embedded in the enhanced image (also referred to herein as a "delta pose"). The head position computing device 217 may then warp the enhanced image based on the difference between the second head pose and the first head pose to correct for head motion of the user. Warping may entail constructing a planar homography (e.g., projective transformation) that maps incorrectly-located pixels in the enhanced image to correctly-located pixels (based on the translation and rotation of the user's head). For example, the pixels of the enhanced image may be shifted, rotated, and/or stretched to accurately represent the current perspective of the user (associated with the head position measurements 265 and the second pose). In an alternative embodiment, the second head pose is a projected future head pose calculated using inertial motion data collected by the head position sensor(s) 215. Predicting a future head pose may further decrease perceived latency between head motion and display update.

After the pose-augmentation 270 by the head position computing device 217, the enhanced image may be presented to the user of the HWD 210 on a display. The display may comprise, for example, a monocular or binocular display, and may be a transparent display, a semi-transparent display, or an opaque display. In some embodiments, the display may be embedded in glasses, goggles, a helmet, and may include cathode ray tubes (CRTs), liquid crystal displays (LCDs), or organic light-emitting diodes (OLEDs). In some embodiments, the display may comprise a projector.

Since the pose augmentation 270 is performed by the head position computing device 217 of the HWD 210 (as opposed to, for example, rerendering the image at the image rendering computing device 227), the latency between head motion and visual update at the display may be significantly reduced. Furthermore, costly hardware (for example, one or more GPUs) may not be required for rerendering the image with the second head pose, and the pose augmentation 270 may be integrated into existing systems.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system configured for low-latency split-rendering with embedded pose data comprising:
   a) a head worn display communicatively coupled to an image rendering computing device, the head worn display comprising:
      one or more image sensors configured to capture an image of an environment surrounding a user of the head worn display;
      a head position sensor configured to measure the user's head position; and
      a head position computing device configured to determine a first head pose based on head position measurements generated by the head position sensor at a first time; and
   b) the image rendering computing device configured to:
      render an enhanced image based on the image of the environment surrounding the user of the head worn display; and
      embed the first head pose in the enhanced image;
   wherein the head position computing device of the head worn display is further configured to:
      determine a second head pose based on second head position measurements generated by the head position sensor at a second time which is different than the first time, wherein the second head pose is a projected future head pose;
      determine a difference between the second head pose and the first head pose wherein the second head pose is a projected future head pose;
      warp the enhanced image based on the difference between the second head pose and the first head pose wherein the second head pose is a projected future head pose, to correct for head motion of the user, wherein warping the enhanced image comprises:
      constructing a planar homography based on the difference between the second head pose and the first head pose; and
      present the enhanced image to the user of the head worn display,
      wherein the system is at least one of an augmented reality (AR) display system, a virtual reality (VR) display system, or a mixed reality (MR) display system.

2. The system of claim 1, wherein the head worn display is at least one of a transparent display, a semi-transparent display, or an opaque display.

3. The system of claim 1, wherein the head position computing device comprises a field programmable gate array (FPGA), the FPGA configured to determine the first head pose.

4. The system of claim 1, wherein the head position computing device comprises a field programmable gate array (FPGA), the FPGA configured to perform the warp of the enhanced image.

* * * * *